(12) United States Patent
Lee et al.

(10) Patent No.: US 11,693,455 B2
(45) Date of Patent: Jul. 4, 2023

(54) FOLDABLE HINGE MODULE FOR PORTABLE TERMINAL

(71) Applicant: PARTSTEC Construction Co., Ltd, Gumi-si (KR)

(72) Inventors: Young Tak Lee, Gumi-si (KR); Kil Seok Jeong, Gumi-si (KR)

(73) Assignee: PARTSTEC Construction Co., Ltd, Gumi-si (KR)

( * ) Notice: Subject to any disclaimer, the term of this patent is extended or adjusted under 35 U.S.C. 154(b) by 239 days.

(21) Appl. No.: 17/113,435

(22) Filed: Dec. 7, 2020

(65) Prior Publication Data

US 2021/0373611 A1 Dec. 2, 2021

(30) Foreign Application Priority Data

May 26, 2020 (KR) .................. 10-2020-0062730

(51) Int. Cl.

| | |
|---|---|
| *G06F 1/16* | (2006.01) |
| *H04M 1/02* | (2006.01) |
| *E05D 1/04* | (2006.01) |
| *E05D 5/02* | (2006.01) |
| *E05D 11/08* | (2006.01) |

(52) U.S. Cl.
CPC .......... *G06F 1/1681* (2013.01); *G06F 1/1652* (2013.01); *H04M 1/0268* (2013.01); *E05D 1/04* (2013.01); *E05D 5/02* (2013.01); *E05D 11/087* (2013.01); *E05Y 2900/606* (2013.01)

(58) Field of Classification Search
CPC ....... G06F 1/1681; G06F 1/1652; E05D 1/04; E05D 5/02; E05D 11/082; E05D 11/087; E05Y 2900/606
See application file for complete search history.

(56) References Cited

U.S. PATENT DOCUMENTS

| | | | | |
|---|---|---|---|---|
| 11,301,006 | B2 * | 4/2022 | Hsu ...................... | G06F 1/1641 |
| 11,353,931 | B2 * | 6/2022 | Hsu ...................... | G06F 1/1681 |
| 2021/0267076 | A1 * | 8/2021 | Zhang ................. | E05D 11/1014 |
| 2021/0271294 | A1 * | 9/2021 | Liao .................... | H04M 1/0216 |
| 2021/0286413 | A1 * | 9/2021 | Chen .................... | H04M 1/022 |
| 2021/0318723 | A1 * | 10/2021 | Cheng .................. | G06F 1/1637 |
| 2021/0373609 | A1 * | 12/2021 | Kim ...................... | G06F 1/1681 |
| 2022/0046813 | A1 * | 2/2022 | Cheng ..................... | G09F 9/301 |
| 2022/0086265 | A1 * | 3/2022 | Shang .................... | F16C 11/04 |
| 2022/0100239 | A1 * | 3/2022 | Siddiqui ............... | G06F 1/1618 |
| 2022/0155828 | A1 * | 5/2022 | Hsiang ................. | G06F 1/1681 |

* cited by examiner

*Primary Examiner* — Victor D Batson
*Assistant Examiner* — Matthew J Sullivan

(57) ABSTRACT

Proposed is a foldable hinge module for a portable terminal, and more particularly, a foldable hinge module for a portable terminal that can easily unfold or fold a flexible display mounted on the portable terminal. In the foldable hinge module for a portable terminal, the flexible display can be smoothly unfolded or folded as the first rotary plate and the second rotary plate are easily rotated in the Y axis direction, by using the gear set part engaged with the first gear part formed in the first rotary plate and the second gear part formed in the second rotary plate to be operated.

8 Claims, 10 Drawing Sheets

FOLDABLE HINGE MODULE FOR PORTABLE TERMINAL

CROSS-REFERENCE TO RELATED APPLICATION

This application claims priority to and the benefit of Korean Patent Application No. 10-2020-0062730, filed on May 26, 2020, the disclosure of which is incorporated herein by reference in its entirety.

TECHNICAL FIELD

The present disclosure relates to a foldable hinge module for a portable terminal, and more particularly, to a foldable hinge module for a portable terminal that can easily unfold or fold a flexible display mounted on the portable terminal.

BACKGROUND ART

In general, a flexible display panel is a display panel that may be curved at a predetermined curvature.

Because the flexible display panel uses a plastic substrate instead of a generally used glass substrate, a low-temperature manufacturing processor is mainly used instead of an existing manufacturing processor to prevent damage to the board.

The flexible display panel is manufactured of a touch screen, for example, which allows a capacitive or reduced pressure type touch input so that a command of a user may be received in a touch type.

Meanwhile, a conventional portable foldable display device, that is, a foldable portable terminal includes a flexible display panel that allows a touch input.

The conventional foldable portable terminal forms a predetermined accommodation space at a portion at which a pair of bodies that support a flexible display panel are hinge-coupled to each other such that a folded part of the flexible display panel is deflected.

Various hinge modules for opening and closing the flexible display are being currently developed.

However, most of the hinge modules are complex in structure, and the thickness of a folded hinge part is thick.

DISCLOSURE

Technical Problem

The present disclosure has been made in an effort to solve the above-mentioned problems, and provides a foldable hinge module for a portable terminal that can have a smaller thickness when a hinge module mounted to the portable terminal, to which a flexible display is applied, is folded, and has a structure that is relatively not complex.

Technical Solution

In accordance with an aspect of the present disclosure, there is provided a foldable hinge module for a portable terminal, including: a central support; a first rotary plate, one end of which is coupled to one side of the central support to be rotatable about the X axis and having a first gear part; a second rotary plate, one end of which is coupled to an opposite side of the central support to be rotatable about the X axis and having a second gear part; and a gear set coupled to the central support to be rotatable about the Z axis and operated while being engaged with the first gear part and the second gear part, wherein a flexible display is coupled to an upper surface of the first rotary plate and an upper surface of the second rotary plate, wherein the first rotary plate and the second rotary plate are rotated about the central support in the X axis direction to be closer to each other or farther away from each other, and wherein the gear set is operated by the first gear part that is rotated in the X axis direction when the first rotary plate is rotated about the X axis, and the second rotary plate is rotated about the X axis while the second gear part operated in conjunction with the gear set is rotated in the X axis direction.

A central axis of rotation of the first rotary plate about the central support and a central axis of rotation of the second rotary plate about the central support may be located on opposite sides in the Y axis direction with respect to the central line of the central support.

The first gear part may protrude downwards from one end of the first rotary plate and a first tooth shape may be formed on a side surface of the first gear part, the second gear part may protrude downwards from one end of the second rotary plate and a second tooth shape may be formed on a side surface of the first gear part, and the gear set may be engaged with the first tooth shape and the second tooth shape between the first gear part and the second gear part such that the gear set is rotated in the Z axis direction when the first gear part or the second gear part is rotated in the X axis direction.

Each of the first gear part and the second gear part may have a crown gear having the first tooth shape and the second tooth shape on a side surface thereof and may be engaged with the gear set disposed therebetween, and the gear set engaged with the first gear part and the second gear part may connect rotations of the first rotary plate and the second rotary plate.

Each of the first gear and the second gear may have an arc shape.

The central support may have a first seating recess, in which the first gear set is seated to be rotatable and a second seating recess, in which the second gear part is seated to be rotatable, the first seating recess may have a first through-hole on a side, on which the gear set is disposed, the second seating recess may have a second through-hole on a side, on which the gear set is disposed, and the first tooth shape and the gear set may be engaged with each other through the first through-hole, and the second tooth shape and the gear set may be engaged with each other through the second through-hole.

Three pinion gears may be engaged with the gear set.

First holder parts protruding from opposite sides of the first gear part may disposed at one end of the first rotary plate, second holder parts protruding from opposite sides of the second gear part may be disposed at one end of the second rotary plate, the central support has a first rotation recess, into which the first holder part may be inserted to be rotatable, and a second rotation recess, into which the second holder part may be inserted to be rotatable, a first rotary shaft may protrude from the first rotation recess such that the first holder part is rotated while surrounding the first rotary shaft when the first rotary plate is rotated, and a second rotary shaft may protrude from the second rotation recess such that the second holder part is rotated while surrounding the second rotary shaft when the second rotary plate is rotated.

The foldable hinge module may further include a stopper mounted on the central support to elastically press side surfaces of the first holder part and the second holder part.

A stop recess, into which one end of the stopper is inserted, may be formed on a side surface of each of the first holder part and the second holder part.

Advantageous Effects

The foldable hinge module for a portable terminal of the present disclosure has the following effects.

The present disclosure can be mounted on a portable terminal which has a structure that is relatively not complex and to which the flexible display is applied whereby the hinge module can be easily folded or unfolded and the thickness of the hinge module can be made smaller when the hinge module is folded.

DESCRIPTION OF THE INVENTION

BEST MODE

Figure 1:
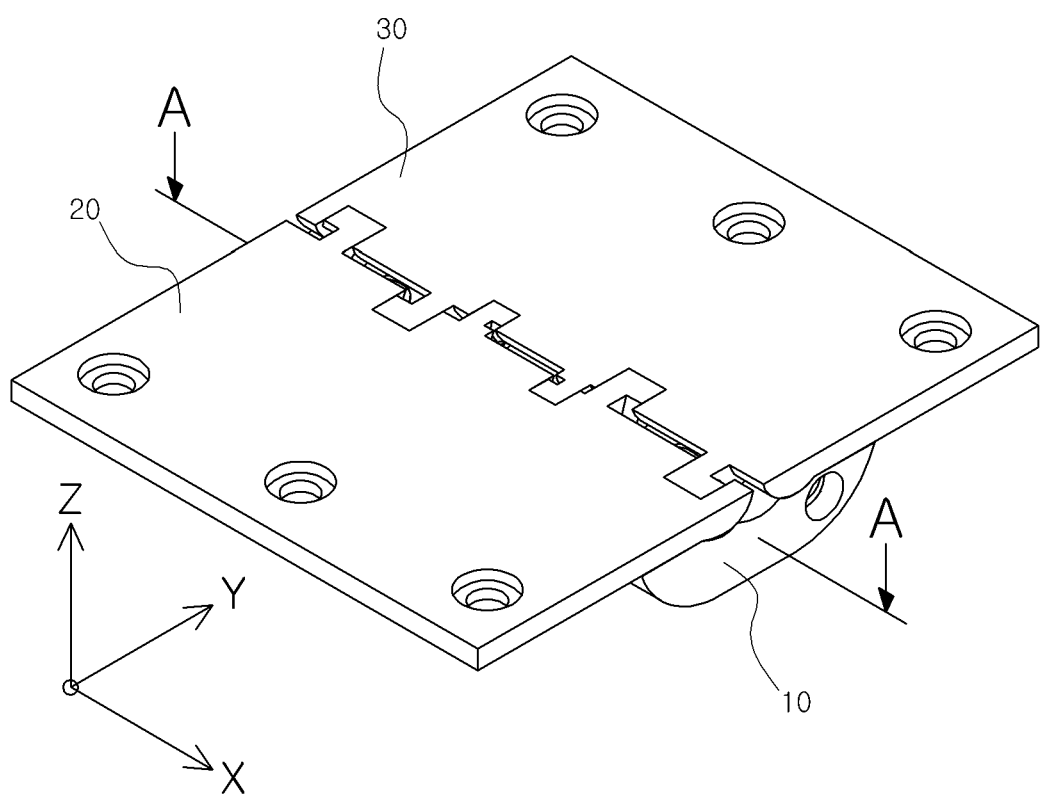
FIG. 1 is a top perspective view of a state, in which a portable hinge module for a portable terminal is unfolded, according to an embodiment of the present disclosure.

A foldable hinge module for a portable terminal according to the present disclosure, as illustrated in FIGS. 1 to 4, includes a central support 10, a first rotary plate 20, a second rotary plate 30, and a gear set 40.

A first seating recess 11, a second seating recess 12, a first rotation recess 13, and a second rotation recess 14 are formed on an upper surface of the central support 10.

As will be described later, the first seating recess 11 is a portion, in which the first gear part 21 of the first rotary plate 20 is seated, the second seating recess 12 is a portion, in which the second gear part 31 of the second rotary plate 30 is seated, the first rotation recess 13 is a portion, into which the first holder part 22 of the first gear part 21 is inserted to be disposed, and the second rotation recess 14 is a portion, into which the second holder part 32 of the second gear part 31 is inserted to be disposed.

In the drawings of the present embodiment, one first seating recess 11 and one second seating recess 12 are formed, and two first rotation recesses 13 and two second rotation recesses 14 are formed.

Further, the first seating recess 11, the second seating recess 12, the first rotation recess 13, and the second rotation recess 14 all have an arc-shaped groove shape.

The central support 10 has a first rotary shaft 15 protruding from the first rotation recess 13 in the X axis direction and a second rotary shaft 16 protruding from the second rotation recess 14 in the X axis direction.

Because two first rotation recesses 13 and two second rotation recesses 14 are formed, two first rotary shafts 15 and two second rotary shafts 16 also are formed.

As described below, the first holder part 22 of the first rotary plate 20 and the second holder part 32 of the second rotary plate 30 are mounted on the first rotary shaft 15 and the second rotary shaft 16 to be rotatable.

Figure 8:
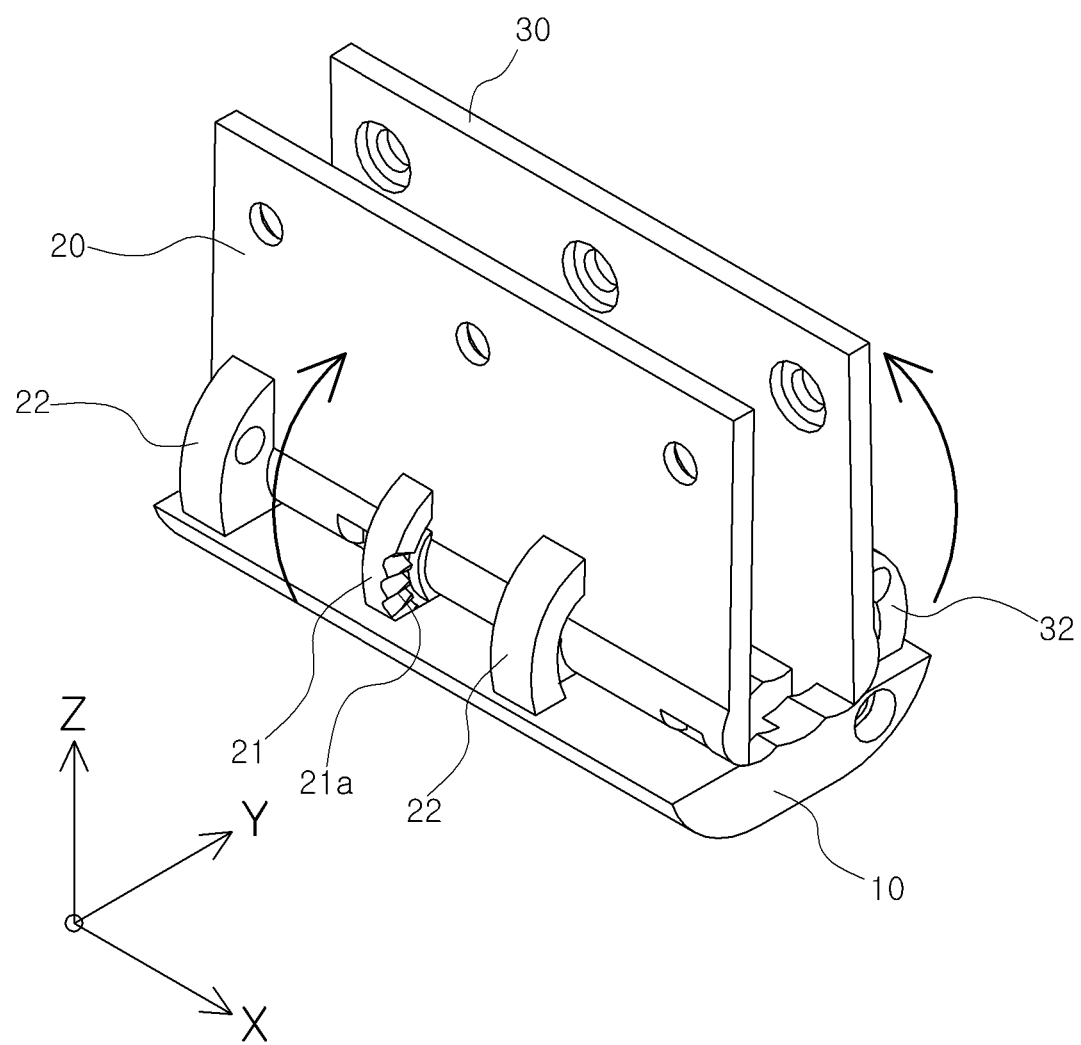
FIG. 8 is a perspective view of a state, in which the portable hinge module for a portable terminal is folded, according to the embodiment of the present disclosure.

Accordingly, as illustrated in FIG. 8, the first rotary plate 20 is rotated about the X axis direction of the first rotary shaft 15, and the second rotary plate 30 is rotated about the X axis direction of the second rotary shaft.

The first rotary shaft 15 and the second rotary shaft 16 are not disposed on a straight line, and are located in opposite sides of the central line of the central support 10 in the Y axis direction.

That is, although both of the first rotary shaft 15 and the second rotary shaft 16 are disposed in the X axis direction, they are disposed not on the same line but two lines disposed along the X axis and spaced apart from each other in the Y axis direction, whereby the first rotary shaft 15 and the second rotary shaft 16 are spaced apart from each other in the Y axis direction.

One end of the first rotary plate 20 is coupled to one side of the central support 10 to be rotatable about the X axis, and the first gear part 21 is formed at one end of the first rotary plate 20.

The first gear part 21 protrudes downwards from one end of the first rotary plate 20 and a first tooth shape 21a is formed on a side surface of the first gear part 21.

The first gear part 21 has an arc shape, and the first tooth shape 21a is formed on a side surface of the first gear part 21 having an arc shape while drawing an arc shape.

The first gear part 21 has a crown gear having the first tooth shape 21a on a side surface thereof.

The first gear part 21 is seated in the first seating recess 11 formed in the central support 10 to be rotatable.

A first through-hole 17 is formed on a lateral side of the first seating recess 11, on which the gear set 40 is disposed.

Further, first holder parts 22 protruding from opposite sides of the first gear part 21 are disposed at one end of the first rotary plate 20.

The first rotation recess 13 formed in the central support 10 is inserted into the first holder part 22 to be rotatable.

Further, the first holder part 22 is disposed to be rotated while surrounding the first rotary shaft 15 formed in the first rotation recess 13, and the first rotary plate 20 is rotated about the X axis direction of the first rotary shaft 15 surrounded by the first holder part 22.

One end of the second rotary shaft 30 is coupled to an opposite side of the central support 10 to be rotatable about the X axis, and the second gear part 31 is formed at one end of the second rotary plate 30.

The second gear part 31 protrudes downwards from one end of the second rotary plate 30 and a second tooth shape 31a is formed on a side surface of the second gear part 31.

The second gear part 31 has an arc shape, and the second tooth shape 31a is formed on a side surface of the second gear part 31 having an arc shape while drawing an arc shape.

The second gear part 31 has a crown gear having the second tooth shape 31*a* on a side surface thereof.

The second gear part 31 is seated in the second seating recess 12 formed in the central support 10 to be rotatable.

A second through-hole 18 is formed on a lateral side of the second seating recess 12, on which the gear set 40 is disposed.

With respect to the gear set 40, the first through-hole 17 and the second through-hole 18 are opened in a direction, in which they face each other.

Further, second holder parts 32 protruding from opposite sides of the second gear part 31 are disposed at one end of the second rotary plate 30.

The second rotation recess 14 formed in the central support 10 is inserted into the second holder part 32 to be rotatable.

Further, the second holder part 32 is disposed to be rotated while surrounding the second rotary shaft 16 formed in the second rotation recess 14, and the second rotary plate 30 is rotated about the X axis direction of the second rotary shaft 16 surrounded by the second holder part 32.

The first rotary plate 2 and the second rotary plate 30 are disposed on opposite sides of the central support 10.

The first rotary plate 20 and the second rotary plate 30 are rotated about the X direction of the central support 10 to be closer to each other or farther away from each other.

Due to the above structure, the first rotary plate 20 and the second rotary plate 30 are rotated about different X axes, that is, about the first rotary shaft 15 and the second rotary shaft 16, respectively, and when viewed from a side, the first rotary shaft 15 that is the central axis of rotation of the first rotary plate 20 and the second rotary shaft 16 that is the central axis of rotation of the second rotary plate 30 are spaced apart from each other in the Y axis direction.

Further, the first rotary shaft 15 and the second rotary shaft 16 are disposed on opposite directions of the Y axis with respect to the central line of the central support 10, and are eccentric to opposite sides of the central line of the central support 10.

Accordingly, the central axis of rotation of the first rotary plate 20, the central axis of rotation of the second rotary plate 30, and the central point of the central support 10 are disposed at different locations in the Y axis direction.

Due to the rotation structures of the first rotary plate 20 and the second rotary plate 30, the interval between the first rotary plate 20 and the second rotary plate 30 when they are unfolded in opposite directions in the Y axis direction is smaller than the interval between the first rotary plate 20 and the second rotary plate 30 when they are rotated relative to each other in the Y axis direction.

That is, the interval between the first rotary plate 20 and the second rotary plate 30 is smaller when they are unfolded at 180 degrees, and the interval between the first rotary plate 20 and the second rotary plate 30 is larger when they are rotated at 90 degrees to be disposed in parallel to each other.

Figure 9:
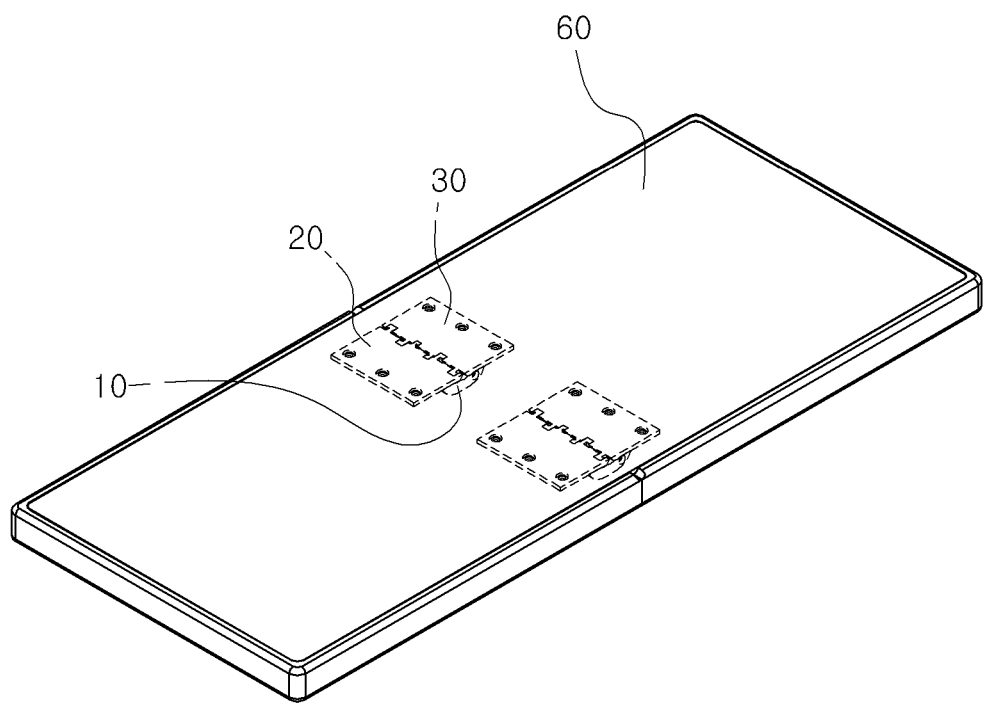
FIG. 9 is a perspective view of a portable terminal, on which the foldable hinge module of the present disclosure is mounted.

Further, the flexible display 60, as illustrated in FIG. 9, is coupled to the upper surface of the first rotary plate 20 and the upper surface of the second rotary plate 30, and the flexible display 60 is unfolded or folded if the first rotary plate 20 and the second rotary plate 30 are rotated about the X axis direction of the central support 10.

Accordingly, the interval between the first rotary plate 20 and the second rotary plate 30 when they are folded in the Y axis direction in parallel to each other is larger than the interval between the first rotary plate 20 and the second rotary plate 30 when they are unfolded in the Y axis direction, a space in which the flexible display 60 folded therebetween may become wider, whereby the flexible display 60 may be accommodated while being safely folded.

Figure 2:
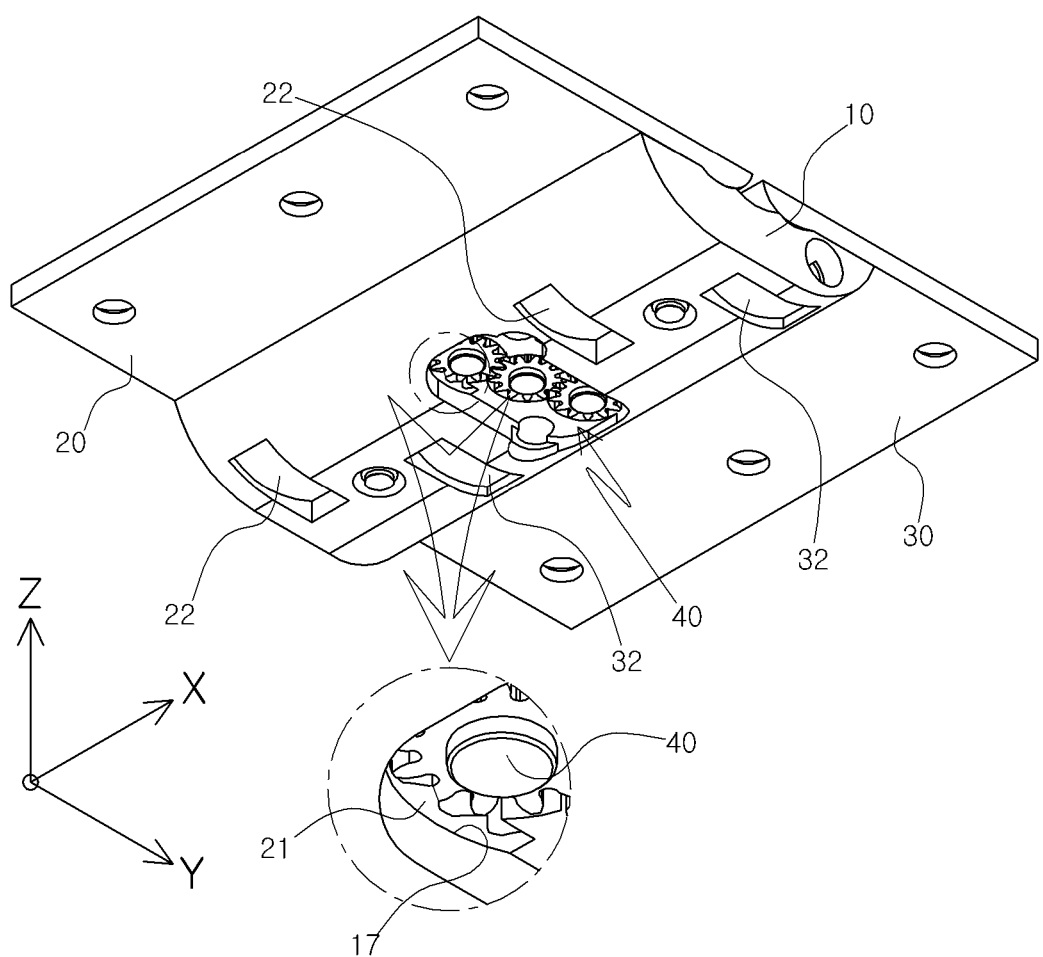
FIG. 2 is a bottom perspective view of a state, in which the portable hinge module for a portable terminal is unfolded, according to the embodiment of the present disclosure.
Figure 3:
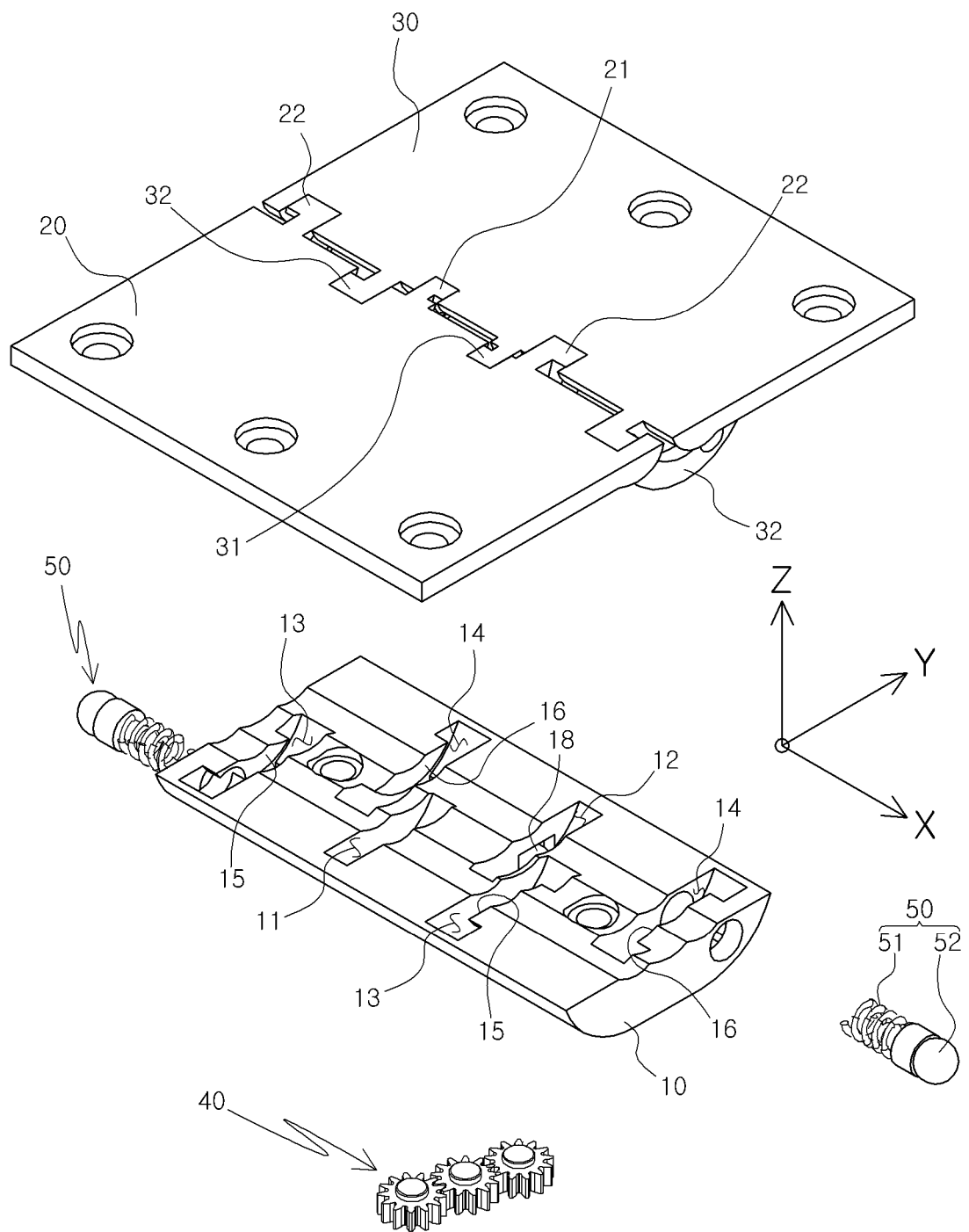
FIG. 3 is a top exploded perspective view of the portable hinge module for a portable terminal according to the embodiment of the present disclosure.
Figure 4:
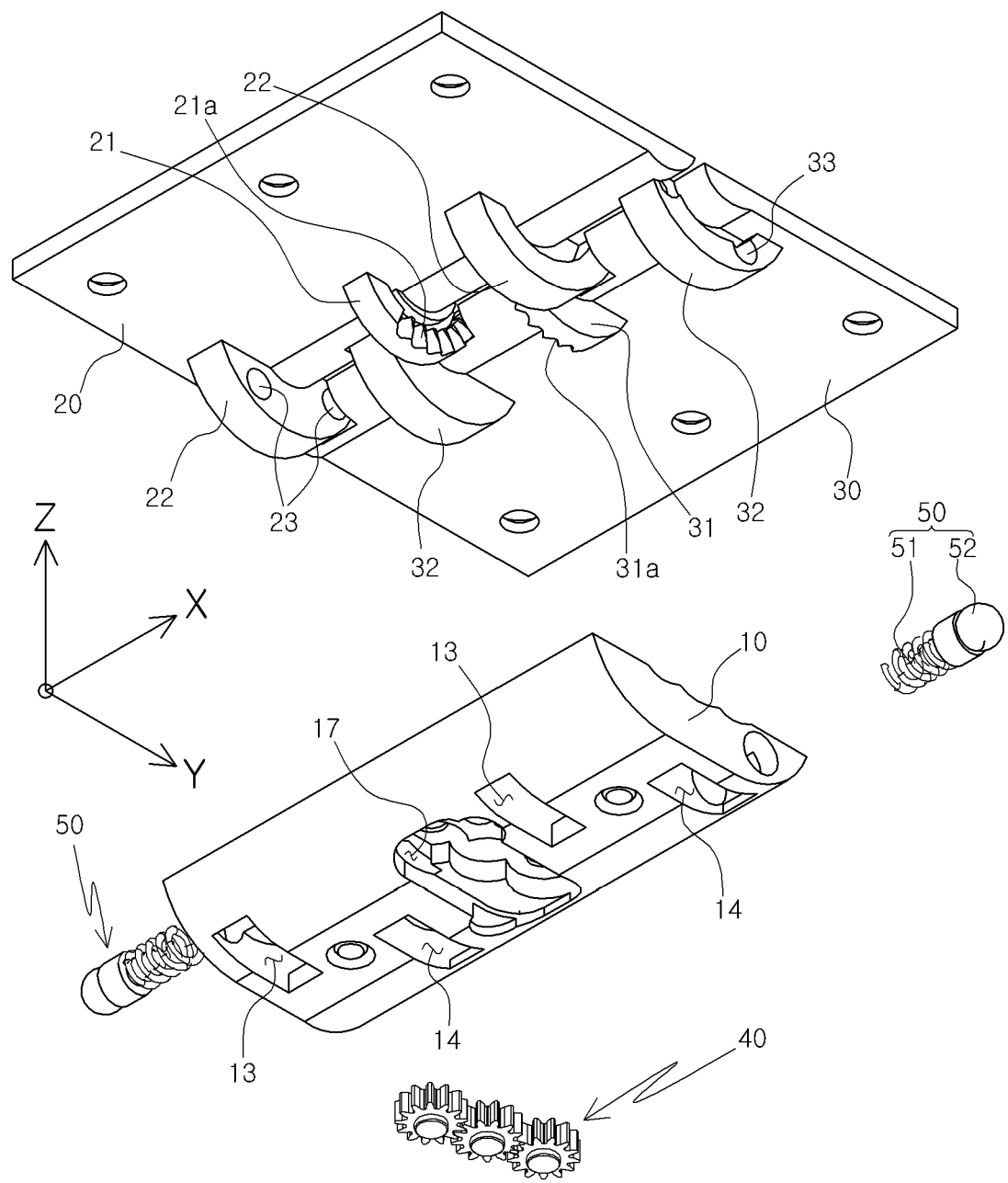
FIG. 4 is a bottom exploded perspective view of the portable hinge module for a portable terminal according to the embodiment of the present disclosure.
Figure 5:
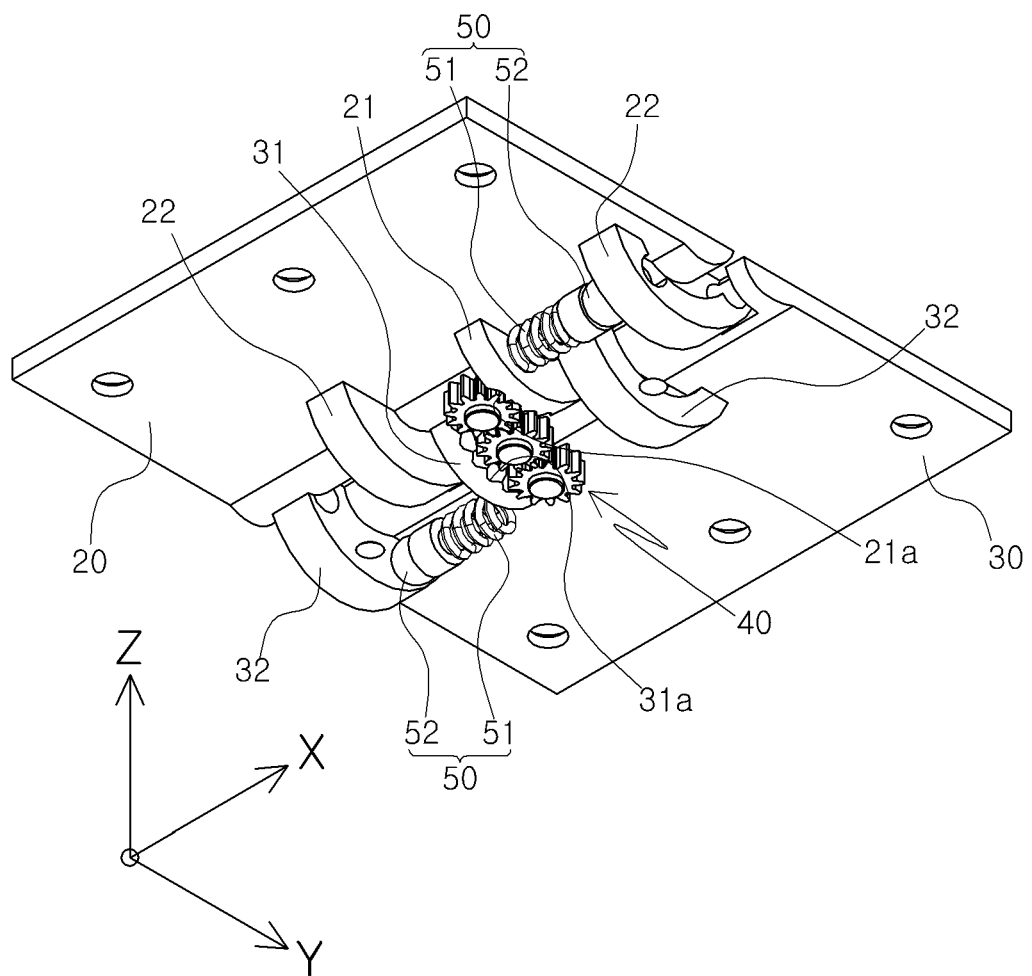
FIG. 5 is a perspective view of FIG. 2 in a state, in which a middle support is excluded.
Figure 6A:
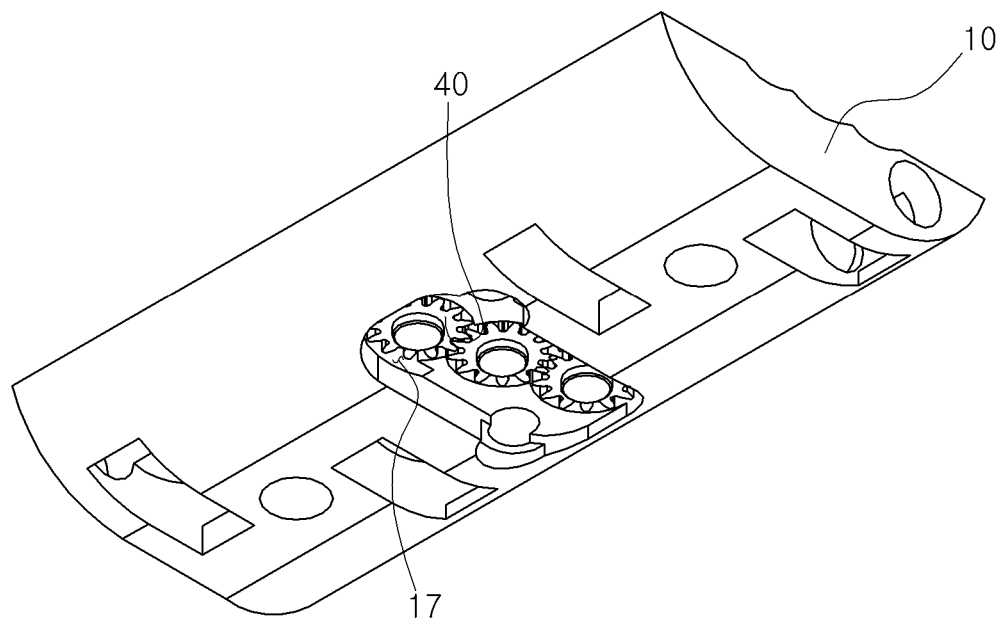
FIGS. 6A-6B are perspective views illustrating the middle support and a gear set in the foldable hinge module for a portable terminal according to an embodiment of the present disclosure.
Figure 6B:
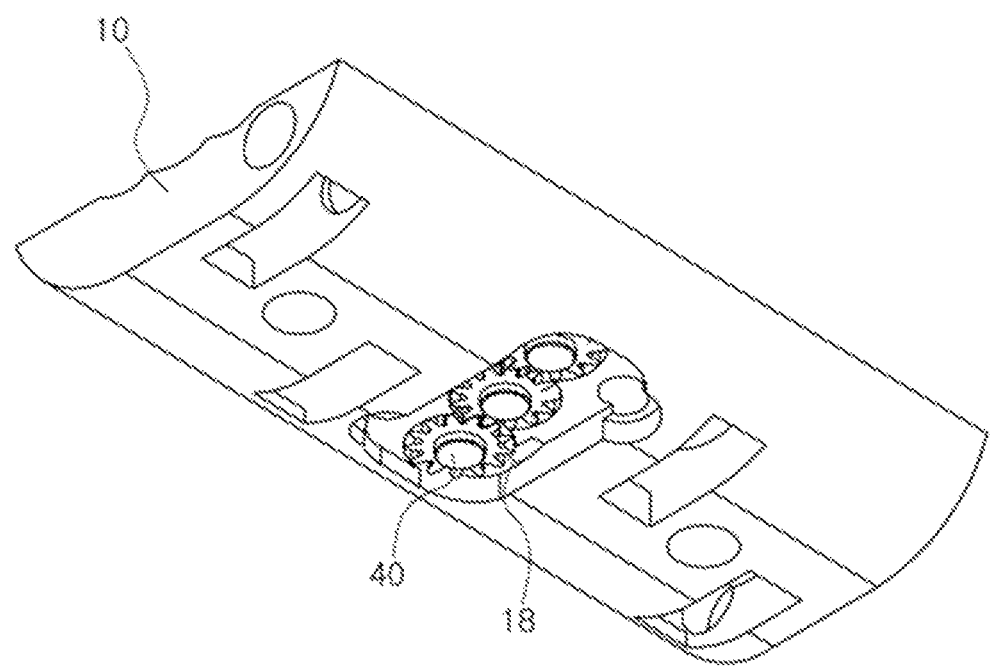

The gear set 40, as illustrated in FIGS. 2 and 6A-B, is coupled to the central support 10 to be rotatable about the Z axis, and as illustrated in FIG. 5, is engaged with the first gear part 21 and the second gear part 31 to be operated.

In more detail, as illustrated above, the first gear part 21 and the second gear part 31 have crown gears having the first tooth shape 21*a* and the second tooth shape 31*a* on side surfaces thereof, respectively, and the gear set 40 is disposed between the first gear part 21 and the second gear part 31 to be engaged with the first gear part 21 and the second gear part 31 to be operated. The gear set 40 engaged with the first gear part 21 and the second gear part 31 connect the first rotary plate 20 and the second rotary plate 30.

The gear set 40 may have various shapes and various structures, and in the present embodiment, the gear set 40 has three pinion gears, which are engaged with each other.

A separate cover that covers the gear set 40, which is mounted to be rotatable, may be mounted on the central support 10.

The gear set 40 is coupled to a lower portion of the central support 10.

The gear set 40 is disposed between the first gear part 21 and the second gear part 31 in a state, in which the first gear part 21 and the second gear part 31 are inserted into the first seating recess 11 and the second seating recess 12.

The gear set 40 disposed in this way, as illustrated in FIG. 5, are engaged with the first tooth shape 21*a* and the second tooth shape 31*a* to be operated.

Figure 7:
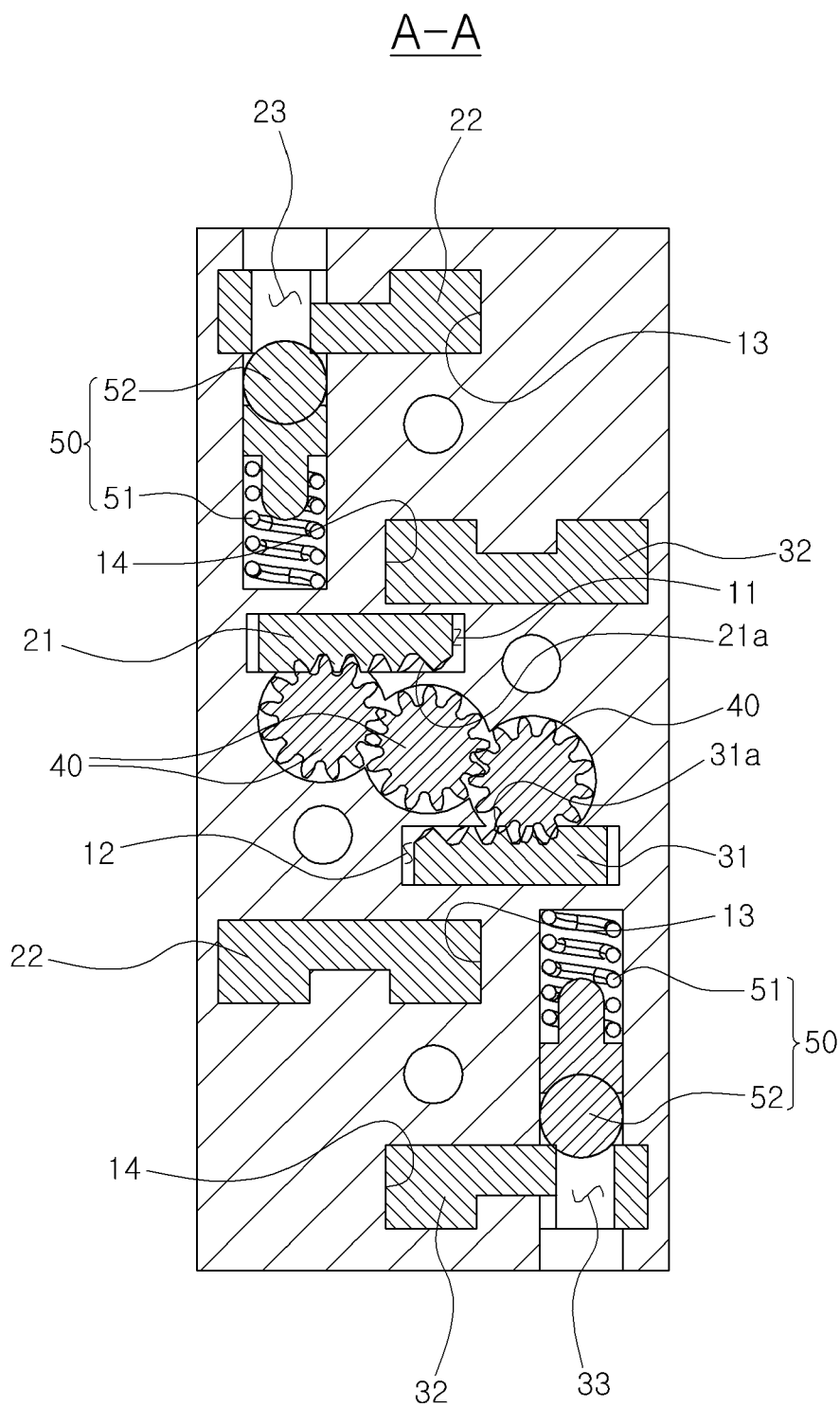
FIG. 7 is a cross-sectional view taken along line A-A of FIG. 1.

In more detail, as illustrated in FIG. 7, the first tooth shape 21*a* and the gear set 40 are engaged with and connected to each other through the first through-hole 17 formed in the first seating recess 11, and the second tooth shape 31*a* and the gear set 40 are engaged with and connected to each other through the second through-hole 18 formed in the second seating recess 12.

Due to the structure, if the first gear part 21 or the second gear part 31 is rotated in the X axis direction, the gear set 40 engaged with the first tooth shape 21*a* or the second tooth shape 31*a* is rotated in the Z axis direction.

In more detail, if the first rotary plate 20 is rotated about the X axis, the gear set 40 is operated, that is, the pinions are rotated by the first gear part 21 rotated about the X axis direction.

If the second gear part 31 engaged with the gear set 40 is rotated about the X axis direction through the operation of the gear set 40, the second rotary plate 30 is rotated about the X axis through the rotation of the second gear part 31.

Due to the process, as illustrated in FIG. 8, the first rotary plate 20 and the second rotary plate 30 are unfolded or rotated in opposite directions and are folded in the same direction.

Meanwhile, the present disclosure may further include a stopper 50 mounted on the central support 10 to elastically press the side surfaces of the first holder part 22 and the second holder part 32.

As the stopper 50 elastically presses the side surfaces of the first holder part 22 and the second holder part 32, the first rotary plate 20 having the first holder part 22 and the second rotary plate 30 having the second holder part 32 are maintained as they are in a free state, in which an external force is not applied, without being arbitrarily rotated.

In the present embodiment, the stopper 50 includes a ball 52 mounted on the central support 10, and a spring 51.

Further, stop recesses 23 and 33, into which the balls 52 elastically supported by ends of the stoppers 50, that is, the springs 51 are inserted, may be formed the side surfaces of the first holder part 22 and the second holder part 32.

As illustrated in FIG. 7, if the balls 52 are inserted into the stop recesses 23 and 33 by the elastic forces of the springs 51, the first rotary plate 20 and the second rotary plate 30 can be prevented from being arbitrarily rotated.

Hereinafter, an operational process of the present disclosure including the above configuration will be described.

Figure 10A:
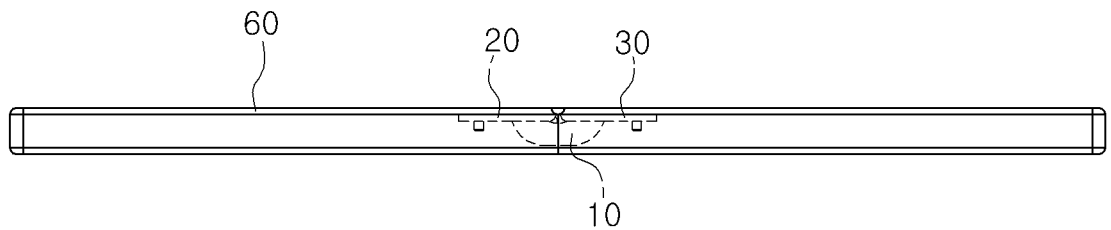
FIGS. 10A-10C are side views illustrating an operational process of the portable terminal illustrated in FIG. 9.

As illustrated in FIGS. 1, 9, and 10A, in a state in which the first rotary plate 20 and the second rotary plate 30 are unfolded in opposite directions, the flexible display 60 coupled to the upper surfaces of the first rotary plate 20 and the second rotary plate 30 appears unfolded.

Figure 10B:
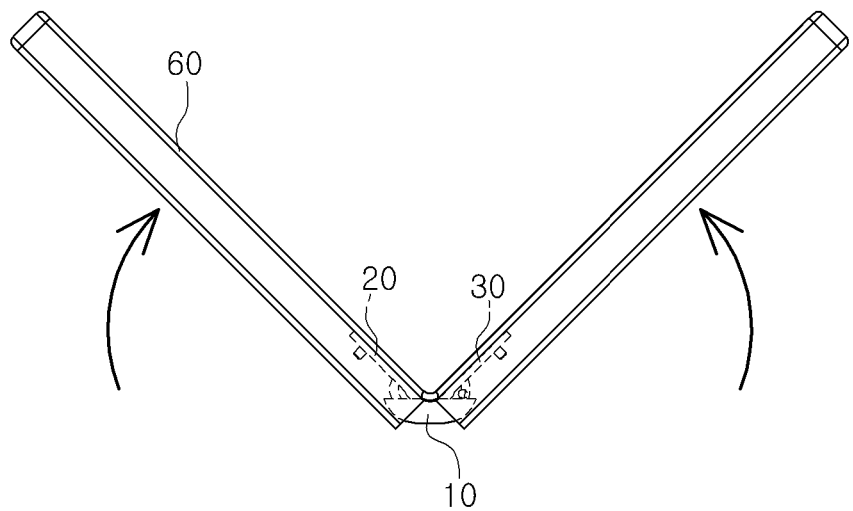
Figure 10C:
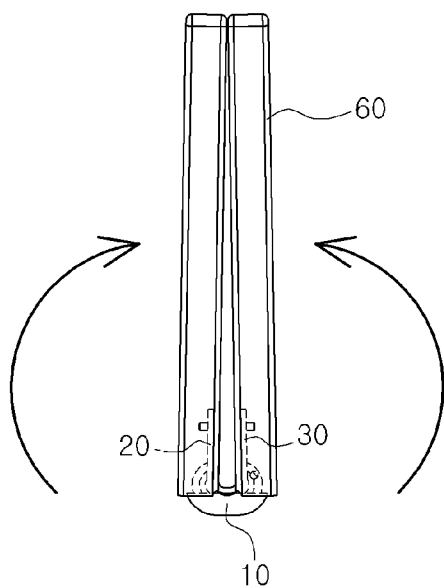

In this state, when the flexible display 60 is to be folded, as illustrated in FIGS. 8, 10B, and 10C, a user rotates the first rotary plate 20 in a direction, in which the second rotary plate 30 is disposed.

Then, the first rotary plate 20 is rotated about the first rotary shaft 15, and then, the gear set 40 engaged with the first tooth shape 21a of the first gear part 21 is operated while the first gear part 21 of the first rotary plate 20 is also rotated about the X axis direction.

As the gear set 40 is operated, the second gear part 31 engaged with the other side of the gear set 40 through the second tooth shape 31a is rotated.

If the second gear part 31 is rotated, the second rotary plate 30 is rotated in a direction in which the second rotary plate 30 faces the first rotary plate 20 while being rotated about the second rotary shaft 16.

Accordingly, even though the user rotates only the first rotary plate 20, the second rotary plate 30 is automatically rotated in the direction of the first rotary plate 20 such that the first rotary plate 20 and the second rotary plate 30 are rotated in directions that are parallel to each other, and then, the flexible display 60 is folded between the first rotary plate 20 and the second rotary plate 30.

When the folded portable terminal is to be unfolded, the above-described process is performed in the reverse way.

According to the present disclosure, because the interval between the first rotary plate 20 and the second rotary plate 30 when they are unfolded is different from the interval between the first rotary plate 20 and the second rotary plate 30 when they are folded, the thickness of the hinge module can be made smaller in the state in which the flexible display 60 of the portable terminal is unfolded, and the flexible display 60 can be stably accommodated when the portable terminal is folded.

The foldable hinge module for a portable of the present disclosure is not limited to the above-described embodiments, and may be variously modified within a range that is allowed by the technical sprit of the present disclosure.

INDUSTRIAL APPLICABILITY

The present disclosure can be applied to a foldable portable terminal, and is industrially applicable.

The invention claimed is:

1. A foldable hinge module for a portable terminal, comprising:
   a central support;
   a first rotary plate, one end of which is coupled to one side of the central support to be rotatable about a X axis and having a first gear part;
   a second rotary plate, one end of which is coupled to an opposite side of the central support to be rotatable about the X axis and having a second gear part; and
   a gear set coupled to the central support to be rotatable about a Z axis and operated while being engaged with the first gear part and the second gear part,
   wherein a flexible display is coupled to an upper surface of the first rotary plate and an upper surface of the second rotary plate,
   wherein the first rotary plate and the second rotary plate are rotated about the central support in a Y axis direction to be closer to each other or farther away from each other, and
   wherein the gear set is operated by the first gear part that is rotated in the Y axis direction when the first rotary plate is rotated about the X axis, and the second rotary plate is rotated about the X axis while the second gear part operated in conjunction with the gear set is rotated in the Y axis direction;
   wherein a central axis of rotation of the first rotary plate about the central support and a central axis of rotation of the second rotary plate about the central support are located on opposite sides in the Y axis direction with respect to the central line of the central support;
   wherein the first gear part protrudes downwards from one end of the first rotary plate and a first tooth shape is formed on a side surface of the first gear part,
   wherein the second gear part protrudes downwards from one end of the second rotary plate and a second tooth shape is formed on a side surface of the first gear part, and
   wherein the gear set is engaged with the first tooth shape and the second tooth shape between the first gear part and the second gear part such that the gear set is rotated about the Z axis when the first gear part or the second gear part is rotated in the Y axis direction;
   wherein each of the first gear and the second gear has an arc shape.

2. The foldable hinge module of claim 1, wherein the central support has a first seating recess, in which the first gear set is seated to be rotatable and a second seating recess, in which the second gear part is seated to be rotatable,
   wherein the first seating recess has a first through-hole on a side, on which the gear set is disposed,
   wherein the second seating recess has a second through-hole on a side, on which the gear set is disposed, and
   wherein the first tooth shape and the gear set are engaged with each other through the first through-hole, and the second tooth shape and the gear set are engaged with each other through the second through-hole.

3. The foldable hinge module of claim 1, wherein first holder parts protruding from opposite sides of the first gear part are disposed at one end of the first rotary plate,
   wherein second holder parts protruding from opposite sides of the second gear part are disposed at one end of the second rotary plate,
   wherein the central support has a first rotation recess, into which the first holder part is inserted to be rotatable, and a second rotation recess, into which the second holder part is inserted to be rotatable,
   wherein a first rotary shaft protrudes from the first rotation recess such that the first holder part is rotated while surrounding the first rotary shaft when the first rotary plate is rotated, and
   wherein a second rotary shaft protrudes from the second rotation recess such that the second holder part is rotated while surrounding the second rotary shaft when the second rotary plate is rotated.

4. The foldable hinge module of claim 3, further comprising:
a stopper mounted on the central support to elastically press side surfaces of the first holder part and the second holder part.

5. The foldable hinge module of claim 4, wherein a stop recess, into which one end of the stopper is inserted, is formed on a side surface of each of the first holder part and the second holder part.

6. A foldable hinge module for a portable terminal, comprising:
a central support;
a first rotary plate, one end of which is coupled to one side of the central support to be rotatable about a X axis and having a first gear part;
a second rotary plate, one end of which is coupled to an opposite side of the central support to be rotatable about the X axis and having a second gear part; and
a gear set coupled to the central support to be rotatable about a Z axis and operated while being engaged with the first gear part and the second gear part,
wherein a flexible display is coupled to an upper surface of the first rotary plate and an upper surface of the second rotary plate,
wherein the first rotary plate and the second rotary plate are rotated about the central support in a Y axis direction to be closer to each other or farther away from each other, and
wherein the gear set is operated by the first gear part that is rotated in the Y axis direction when the first rotary plate is rotated about the X axis, and the second rotary plate is rotated about the X axis while the second gear part operated in conjunction with the gear set is rotated in the Y axis direction;
wherein a central axis of rotation of the first rotary plate about the central support and a central axis of rotation of the second rotary plate about the central support are located on opposite sides in the Y axis direction with respect to the central line of the central support;
wherein the first gear part protrudes downwards from one end of the first rotary plate and a first tooth shape is formed on a side surface of the first gear part,
wherein the second gear part protrudes downwards from one end of the second rotary plate and a second tooth shape is formed on a side surface of the first gear part, and
wherein the gear set is engaged with the first tooth shape and the second tooth shape between the first gear part and the second gear part such that the gear set is rotated about the Z axis when the first gear part or the second gear part is rotated in the Y axis direction; wherein each of the first gear part and the second gear part has a crown gear having the first tooth shape and the second tooth shape on a side surface thereof and is engaged with the gear set disposed therebetween, and the gear set engaged with the first gear part and the second gear part connects rotations of the first rotary plate and the second rotary plate.

7. The foldable hinge module of claim 6, wherein three pinion gears are engaged with the gear set.

8. A foldable hinge module for a portable terminal, comprising:
a central support;
a first rotary plate, one end of which is coupled to one side of the central support to be rotatable about a X axis and having a first gear part;
a second rotary plate, one end of which is coupled to an opposite side of the central support to be rotatable about the X axis and having a second gear part; and
a gear set coupled to the central support to be rotatable about a Z axis and operated while being engaged with the first gear part and the second gear part,
wherein a flexible display is coupled to an upper surface of the first rotary plate and an upper surface of the second rotary plate,
wherein the first rotary plate and the second rotary plate are rotated about the central support in a Y axis direction to be closer to each other or farther away from each other, and
wherein the gear set is operated by the first gear part that is rotated in the Y axis direction when the first rotary plate is rotated about the X axis, and the second rotary plate is rotated about the X axis while the second gear part operated in conjunction with the gear set is rotated in the Y axis direction;
wherein a central axis of rotation of the first rotary plate about the central support and a central axis of rotation of the second rotary plate about the central support are located on opposite sides in the Y axis direction with respect to the central line of the central support;
wherein the first gear part protrudes downwards from one end of the first rotary plate and a first tooth shape is formed on a side surface of the first gear part,
wherein the second gear part protrudes downwards from one end of the second rotary plate and a second tooth shape is formed on a side surface of the first gear part, and
wherein the gear set is engaged with the first tooth shape and the second tooth shape between the first gear part and the second gear part such that the gear set is rotated about the Z axis when the first gear part or the second gear part is rotated in the Y axis direction; wherein three pinion gears are engaged with the gear set.

* * * * *